US007668880B1

(12) United States Patent  
Carroll

(10) Patent No.: US 7,668,880 B1  
(45) Date of Patent: Feb. 23, 2010

(54) OFFSITE COMPUTER FILE BACKUP SYSTEM PROVIDING RAPID RECOVERY AND METHOD THEREOF

(76) Inventor: Jim Carroll, c/o Carroll-Net, Inc., 905 Main St., Hackensack, NJ (US) 07601

( * ) Notice: Subject to any disclaimer, the term of this patent is extended or adjusted under 35 U.S.C. 154(b) by 309 days.

(21) Appl. No.: 11/803,954

(22) Filed: May 15, 2007

(51) Int. Cl.
G06F 12/00 (2006.01)
G06F 17/30 (2006.01)

(52) U.S. Cl. ...................................................... 707/204
(58) Field of Classification Search .................. None
See application file for complete search history.

(56) References Cited

U.S. PATENT DOCUMENTS

| | | | | |
|---|---|---|---|---|
| 5,237,680 A | * | 8/1993 | Adams et al. | 707/200 |
| 5,276,860 A | * | 1/1994 | Fortier et al. | 714/6 |
| 5,276,867 A | * | 1/1994 | Kenley et al. | 707/204 |
| 5,634,052 A | * | 5/1997 | Morris | 707/1 |
| 5,745,750 A | * | 4/1998 | Porcaro | 707/102 |
| 5,765,173 A | * | 6/1998 | Cane et al. | 707/204 |
| 5,778,395 A | * | 7/1998 | Whiting et al. | 707/204 |
| 5,813,017 A | * | 9/1998 | Morris | 707/204 |
| 5,835,953 A | * | 11/1998 | Ohran | 711/162 |
| 5,852,713 A | * | 12/1998 | Shannon | 714/6 |
| 6,061,770 A | * | 5/2000 | Franklin | 711/162 |
| 6,085,298 A | * | 7/2000 | Ohran | 711/162 |
| 6,101,585 A | * | 8/2000 | Brown et al. | 711/162 |
| 6,119,118 A | * | 9/2000 | Kain et al. | 707/10 |
| 6,366,986 B1 | * | 4/2002 | St. Pierre et al. | 711/162 |
| 6,397,308 B1 | * | 5/2002 | Ofek et al. | 711/162 |
| 6,411,943 B1 | * | 6/2002 | Crawford | 705/400 |
| 7,155,465 B2 | * | 12/2006 | Lee et al. | 707/204 |
| 7,284,150 B2 | * | 10/2007 | Ma et al. | 714/6 |
| 7,310,654 B2 | * | 12/2007 | McNeil | 707/204 |
| 7,315,959 B2 | * | 1/2008 | Wu | 714/6 |
| 2002/0059505 A1 | * | 5/2002 | St. Pierre et al. | 711/162 |
| 2003/0145248 A1 | * | 7/2003 | McNeil | 714/13 |
| 2006/0200639 A1 | * | 9/2006 | Levy et al. | 711/162 |
| 2007/0130232 A1 | * | 6/2007 | Therrien et al. | 707/204 |
| 2008/0034268 A1 | * | 2/2008 | Dodd et al. | 714/755 |

OTHER PUBLICATIONS

Green, R.J., A.C. Baird and J.C. Davies "Designing a Fast, On-line Backup System for a Log-structured File System", Digital Technical Journal, vol. 8, No. 2, 1996, pp. 32-45.*

(Continued)

*Primary Examiner*—Luke S Wassum
(74) *Attorney, Agent, or Firm*—Pryor Cashman LLP; Andrew S. Langsam

(57) ABSTRACT

A computer file backup system and method are provided. An onsite backup device is in communication with the primary device and includes a first backup copy of the files. The primary device includes a first instance of file modification detection software. The onsite backup device includes a first instance of file modification software, as well as a second instance of the file modification detection software. A central backup device is provided in communication with the onsite backup device, and a second backup copy of the files resides there. The central backup device includes a second instance of the file modification software. The detection software detects respective changes to the files between i) the original files and the first copy, or ii) the first copy and the second copy, to determine which files have been updated or renamed. A fork is provided on the backup devices to preserve file metadata.

20 Claims, 11 Drawing Sheets

OTHER PUBLICATIONS

Austin, P. "Add and Delete Code", in CVS Tutorial, downloaded from www.eos.ubc.ca/research/moc2/cvstutorial/adddel.html, Mar. 13, 2003.*

Carroll.net "Healthy Data Center Deluxe™", downloaded from www.carroll.net, Feb. 9, 2005.*

Carroll.net, "Healthy Server Basic™", downloaded from www.carroll.net, Feb. 9, 2005.*

Marks, H. "Data De-Duping: An Antidote to Bloated Storage", Network Computing, Mar. 19, 2007.*

* cited by examiner

OFFSITE COMPUTER FILE BACKUP SYSTEM PROVIDING RAPID RECOVERY AND METHOD THEREOF

BACKGROUND OF THE INVENTION

1. Field of the Invention

The invention relates to computer file backup systems and methods. More specifically, the invention relates to client-server systems for backing up computer files both locally at a customer or primary site and remotely at an offsite or datacenter site while providing rapid recoverability of lost or damaged files as well as file metadata in the event of destruction of all or part of the primary site (or at least its computer system).

2. Description of Related Art

Businesses, universities, and any entities using computers and computer files need to protect their files from accidental loss or damage. A fire, an ill-placed and spilled beverage, or an electrical surge can degrade or eliminate an entire server's contents in seconds. Many entities back up their files onto a supplemental medium such as a tape or similar device periodically, e.g., nightly or weekly. Some of the systems that have evolved utilizing tape backup require manual insertion of a tape into a tape drive or reader on a periodic basis. Any system requiring human intervention to replace a tape is potentially at the mercy of human error.

Automatic backup systems are also known. In many such systems, software is provided on the onsite computer system to automatically, e.g., at timed intervals, transfer a copy of the contents of the system onto a remote or offsite computer system. Although most file system backup occurs when there is little or no activity on the client or local onsite system (e.g., at night), such software-only systems have an inherent lag time with respect to recovering lost or damaged files. Customers of such systems (i.e., the owners of the various local sites) typically need to wait a significant and often impractically long amount of time for recovery of files to be transferred back to them, even over the Internet.

In 2005, the instant inventor devised a system in which a piece of backup equipment was installed onsite at the customer's site. This equipment was installed with a mixture of Open Source software and proprietary code. Each evening, the onsite device would copy the customer's files and store them, then later in the evening, transmit the changes to a central remote or offsite datacenter. Once at the datacenter, the customer's data was copied to tape. By the inventor providing each customer with their own onsite equipment, customers would be able to recover data more rapidly. As an example, a modest sized server would take a week to restore using a software-only system, whereas the same server could be recovered in one hour using the inventor's previous system utilizing an onsite backup device.

Yet even Applicant's previous system was not ideal. One problem that needed solving for file backup was caused whenever customers reorganized their files. Applicant's previous system would interpret this as a deletion of old content, and creation of new content. This meant that a simple reorganization could result in re-copying files back to the offsite datacenter in their entirety. Rather than minutes for an update, it could mean hours or even days of extra synchronization work.

The problem can best be illustrated with the following example. Say a customer has a primary device with a folder C:\FOLDER1 and that in that folder is a single file PROPOSAL.DOC. The first time the customer's files are backed up to the onsite device, the device creates a copy of the folder and file and stores the copy on its hard drive. Each night thereafter, the onsite device would check the primary device to match PROPOSAL.DOC and only need to update its copy with changes.

The trouble arose when the customer renamed the folder as C:\FOLDER2. That night, the onsite device would recognize there was no longer a folder called C:\FOLDER1, and so would delete its copy of the folder and its file. It would then recognize there was a new folder C:\FOLDER2 that needed to be copied, forcing a complete copy of the file and folder to be copied and thus prepared for back-up.

If PROPOSAL.DOC were very large, say in the hundreds of megabytes or even gigabytes range, the additional copy could take hours to then transmit to the datacenter. This could be made even worse in cases where the simply renamed folder had hundreds or thousands of files—all which now need to be recopied.

Another problem that arose was rooted in the Microsoft Windows® file protection system, referred to as Access Control Lists (ACLs). In Windows®, each file is considered to be owned by a user. Each user's credentials are represented in an organization's or customer's unique coding called a Security Identifier (SID). When a customer's files are backed-up to the central datacenter, the SID information was stripped or removed from the datacenter copy. During a recovery, customers would need to first restore their files, then manually re-create file security information. Even small companies can have tens of thousands of files. This meant days of manual effort to recreate the ACLs.

SUMMARY OF THE INVENTION

The invention is a system and method for backing up original customer computer files residing on a primary device. The system includes a first instance of file modification detection software residing on the primary device. The system further includes an onsite backup device, in communication with the primary device, on which a first copy of the customer computer files are backed up. The onsite backup device has i) a first instance of file modification software in communication with the first instance of the file modification detection software on the primary device, and ii) a second instance of the file modification detection software. The system also includes a central backup device, in communication with the onsite backup device, on which a second copy of the customer computer files are backed up; the central backup device includes a second instance of the file modification software in communication with the second instance of the file modification detection software. The file modification detection software detects respective changes to the files between i) the original files and the first copy, and/or ii) the first copy and the second copy, to enable the onsite and central backup devices to determine which files have been updated or renamed. That is, the two logically adjacent devices are in communication with each other; primary with onsite backup, and onsite backup to central backup (although it is possible under certain conditions for the primary device to communicate directly with the central backup device, e.g., when the onsite backup device is down). The first and second instances of the file modification software respectively alter the first and second copies of the customer computer files in accordance with instructions respectively from the first and second instances of the file modification detection software.

Alternatively, for situations in which the customer does not want or cannot support the first instance of the file modification detection software, the onsite backup device may include both the first and second instances of the file modification detection software (the first instance being in communication with the primary device) as well as the first instance of the file modification software.

The inventive system generally embodies and utilizes five processes: i) an initial determination of work to be done concerning which files need to be updated, removed, added, deleted, etc; ii) a pruning operation; iii) an update request process; iv) an update instruction generation and transmission process; and v) a metadata update and storage operation. In the description that follows, the terms "local" and "remote" refer to the participants in the file backup process; local refers to the device generating and transmitting the backup, remote refers to the device where the backup is to be stored. Similarly, "onsite" means at the location of one or more clients, whereas "central" means at the location of the datacenter.

The basic processes are as follows:

1. Work Determination
  a. Generate a list of files and folders on remote device;
  b. Generate a list of files and folders on local device;
  c. Compare the lists, and make decisions on which files and folders need copying, which need updating, which need renaming and which need deleting.
2. Prune
  a. Delete any remote files and folders on remote device that do not exist on local device.
  b. Rename files and folders on remote device that were renamed on the local device.
3. Update Request
  Request block hashes for remote files that need updating on remote device.
4. Generate Update Instructions
  Generate file update instructions and transmit them to the remote device.
5. Metadata Update
  Update remote file and folder OID, ACL's, ATTR's, FSIZE, and MTIME (see below) information and store the information in a file system fork on the remote file or folder.

DESCRIPTION OF THE PREFERRED EMBODIMENTS AND DRAWINGS

Description of the invention will now be given with reference to FIGS. 1-8. It should be understood that these figures are exemplary in nature and in no way serve to limit the scope of the invention which is defined by the claims appearing hereinbelow.

Figure 1A:
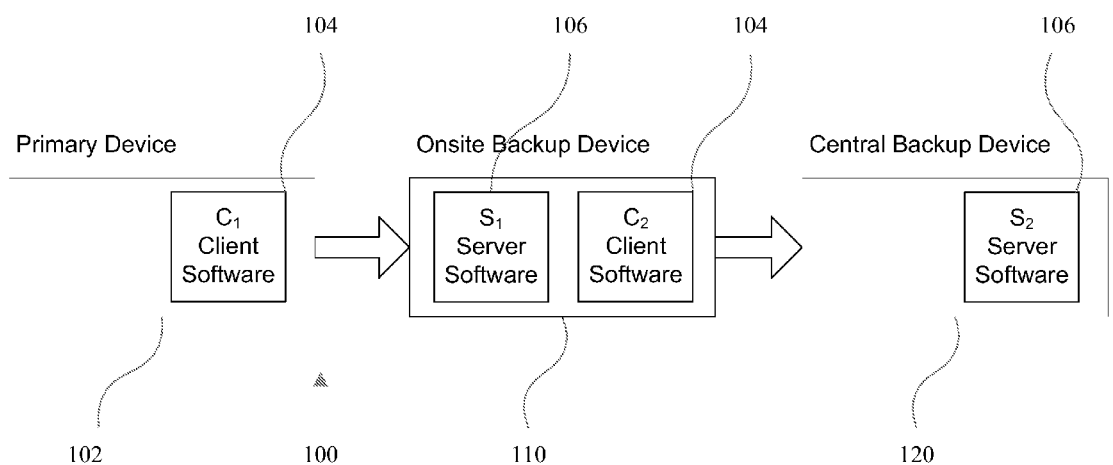
FIGS. 1A-B are schematic diagrams of two embodiments of the client-server architecture of a computer file backup system in accordance with the invention.
Figure 1B:
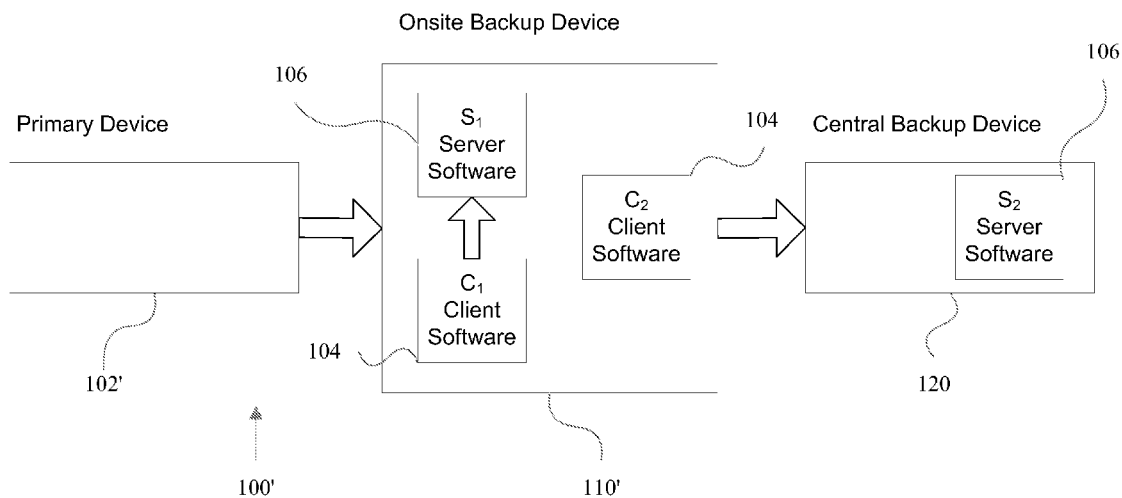

FIGS. 1A-B schematically depicts an overview of the components of the inventive backup system. FIG. 1A shows the preferred architecture of the invention as system 100. A location's (e.g., a customer of a datacenter, a satellite office of a business, or any similar entity) own computer or device 102 is provided with a first instance $C_1$ of client software 104 which is in communication with a first instance $S_1$ server software 106 running on onsite backup device 110. Similarly, a second instance $C_2$ of client software 104 is running on onsite backup device 110 and communicates with a second instance $S_2$ of server software 106 residing and running on central backup device 120 (at the datacenter, main business headquarters, or other similar centralized site).

In some situations, the customer does not want to or cannot host the client software. If so, the system's architecture is reflected in FIG. 1B as system 100'. The first instance of client software 104 resides not on location device 102' but rather on the onsite backup device 110'. The first instance of client software 104 is still in communication with location device 102', but it resides on the onsite backup device 110' instead. The remainder of system 100' is substantially identical to the corresponding portions of system 100.

Figure 2:
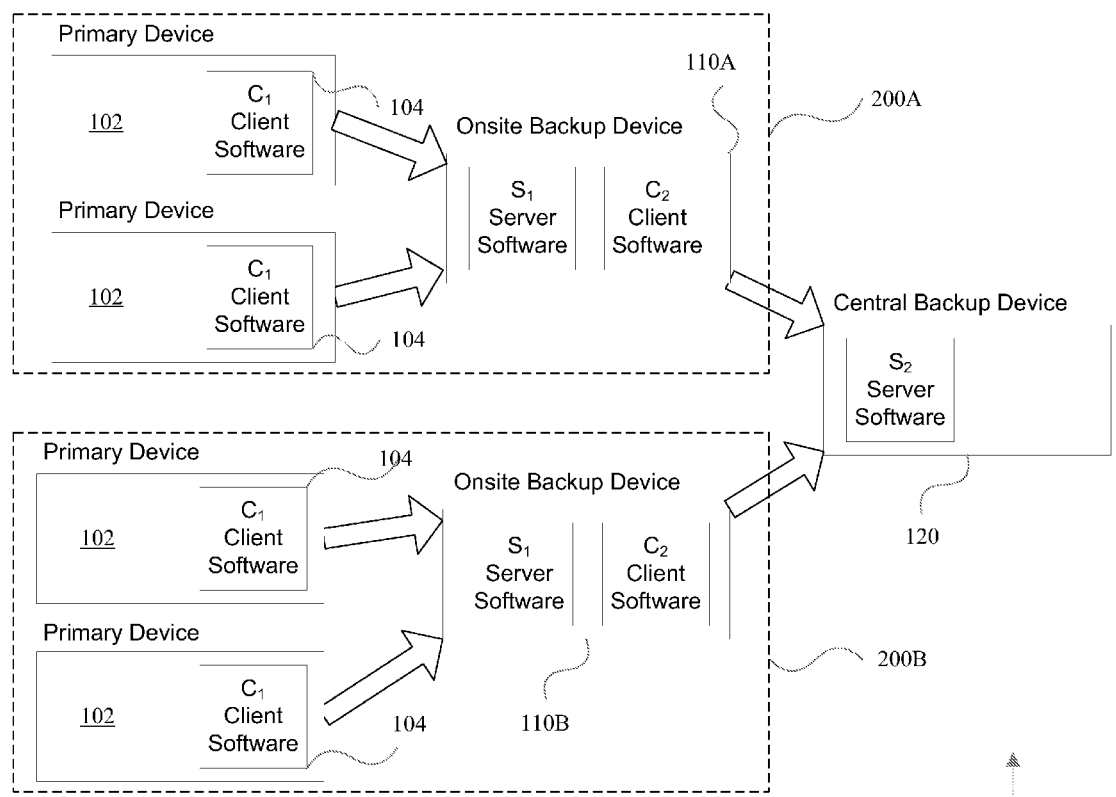
FIG. 2 is a schematic diagram of the system of FIG. 1 but having multiple customers/clients.

FIG. 2 depicts the architecture of an expanded system 100" having several locations 200A and B each feeding into a central backup device 120. Location 200A includes multiple devices 102 each having an instance ($C_1$) of client software 104; each instance $C_1$ communicates to an instance $S_1$ of server software on an onsite backup device 110A. The devices 102 of location 200B communicate similarly to onsite backup device 110B. Each of these onsite backup devices 110A and B have, in turn, instances $C_2$ of client software that communicate with instance $S_2$ of the server software on the central and remote offsite backup device 120.

Figure 3:
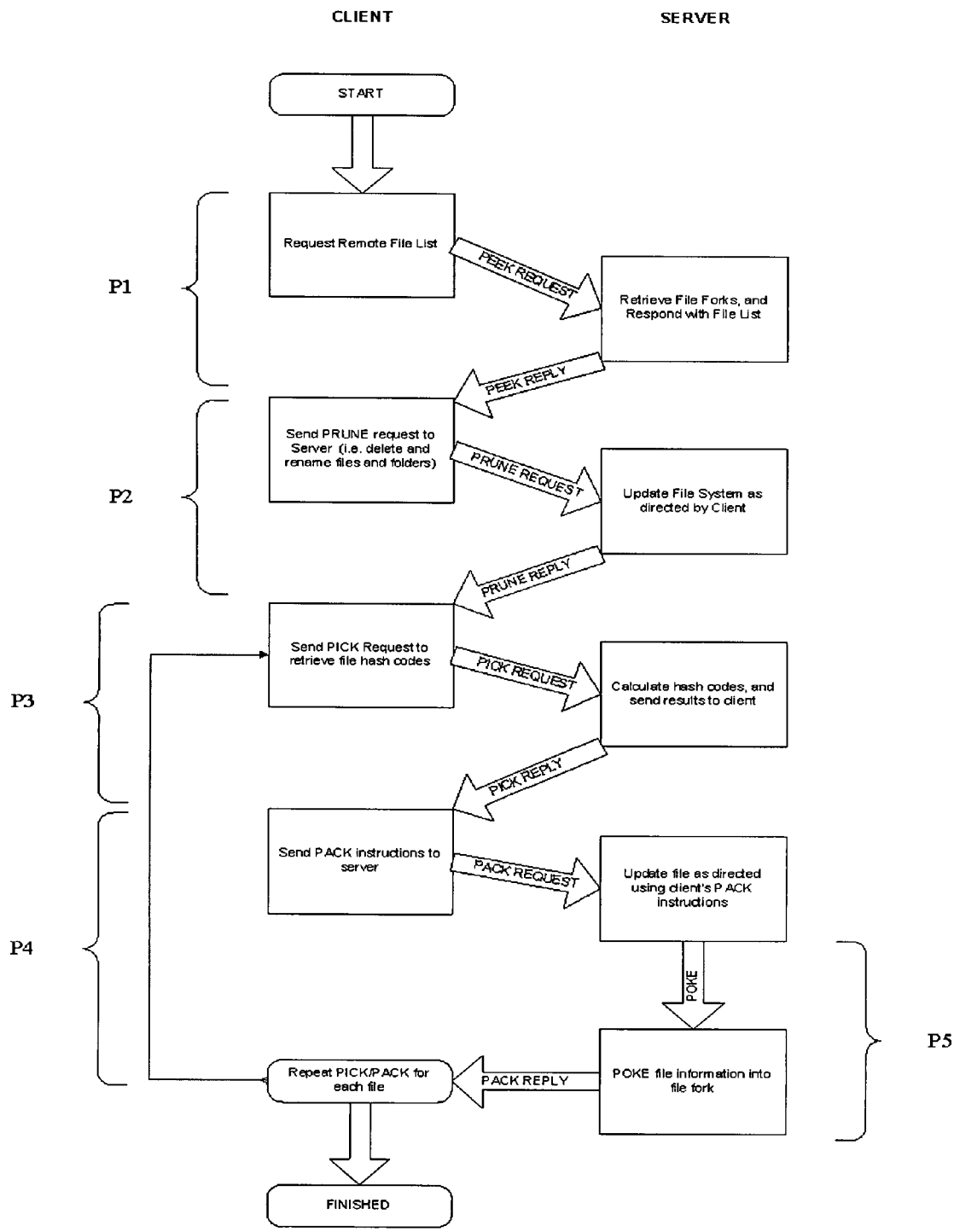
FIG. 3 is a flow chart depicting the overall operation of an embodiment of the inventive computer file backup system focusing on information transmitted between client and server.

The overall flow of interaction between the local/client and remote/server devices appears in FIG. 3. There are five general processes P1-5 depicted. Process P1 is the work determination process, in which lists of files and folders are generated on both the remote device and the local device, and the two lists are compared. Decisions are made concerning which files and folders need copying, which need updating, which need renaming and which need deleting. As shown generally in FIG. 3, first the client requests the remote file list, then the server retrieves the file forks and responds to the client with the remote file list.

In response to the completion of process P1, the client commences process P2, the pruning process, in which any remote files and folders on the remote device that do not exist on local device are deleted, and any files and folders on remote device that were renamed on the local device are renamed on the remote device. As shown in FIG. 3, the client sends a request to the sever to delete and rename the relevant files and folders, and the server responds by updating its file system as directed by the client.

The next process initiated by the client is process P3, the update request process, in which block hashes for remote files that need updating on remote device are requested. The client sends a request to the server to retrieve file hash codes, and in response, the server calculates the hash codes and sends the results to the client. Once that occurs, process P4, update instruction generation, is initiated by the client, in which file update instructions are generated by the client and transmitted to the server. The server then updates its files as directed using those instructions sent from the client. During the operation of process P4, the server performs process P5, the metadata update, in which its files' and folders' object identifiers (OID), access control lists (ACL's), file attributes (ATTR's), file size (FSIZE), and modification time (MTIME) information are updated and the information is stored in a file system fork on the server.

More detailed discussions of the specific steps of processes P1-P5 follow. Reference will be made to files, however it should be understood that the same discussion applies equally to folders as well.

The work determination process P1 is colloquially referred to as the PEEK process. The PEEK process is responsible for determining what work the system needs to perform, where work means updating files/folders on the server, adding files/folders to the server, renaming files/folders on the server and deleting files/folders on the server all in comparison to the client's files/folders. The work to be done is stored in queued lists. There is one queued list for each of these actions—UDPATE, ADD, DELETE, and RENAME queues are employed.

The Peek step retrieves the list of files and folders on the server and compares this with the lists on the client. The comparison logic is as follows:
 If the Client's file modified-time (MTIME) is different than the Server's, add the file to UPDATE queue;
 If the Client's file size (FSIZE) is different than the Server's, add the file to the UPDATE queue;
 If the Client's file attributes (ATTR) are different than the Server's, add the file to the UPDATE queue;
 If the Client's file access control list (ACLs) is different than the Server's, add the file to the UPDATE queue;
 If the Server does not have a copy of the Client's file, add the file to the ADD queue;
 If the Server has a file that doesn't exist on the Client, add the file to the DELETE queue.

After the queue lists are created, another set of comparisons is made, this time comparing the DELETE and ADD queues.

If a file in the DELETE queue has the same Object identifier (OID) as a file in the ADD queue, add the file to the RENAME queue, and remove it from the DELETE and ADD queues.

If a file name in the DELETE queue matches a "material" part of the file name in the ADD queue, add the file to the RENAME queue, and remove it from the DELETE and ADD queues.

The "material" comparison of files in the DELETE and ADD queues is performed as follows:
 Break each file name into pieces, each piece separated by the slash '\' character.
 The last or right-most piece is called the basename. If basenames do not match, the Material comparison fails, skip the file.
 Otherwise
 Count the number of consecutive matching pieces from right to left.
 The more pieces that match, the greater the Material match.
 Keep track of the number of Material matches that occur, and select the file with the greatest number of matches.

An example of the "Material" comparison logic follows:
 DELETE queue entry: C:\FOLDER1\SUB1\FILE.DOC ($D_1$)
 ADD queue entries: C:\FOLDER2\SUB1\FILE.DOC ($A_1$)
 C:\FOLDER1\SUB2\FILE.DOC ($A_2$)
 In this example, $A_1$ is a better match for $D_1$, it matches two consecutive pieces, FILE.DOC and SUB1. $A_2$ only matches 1 piece. Therefore, the system would select $A_1$.

Figure 4A:
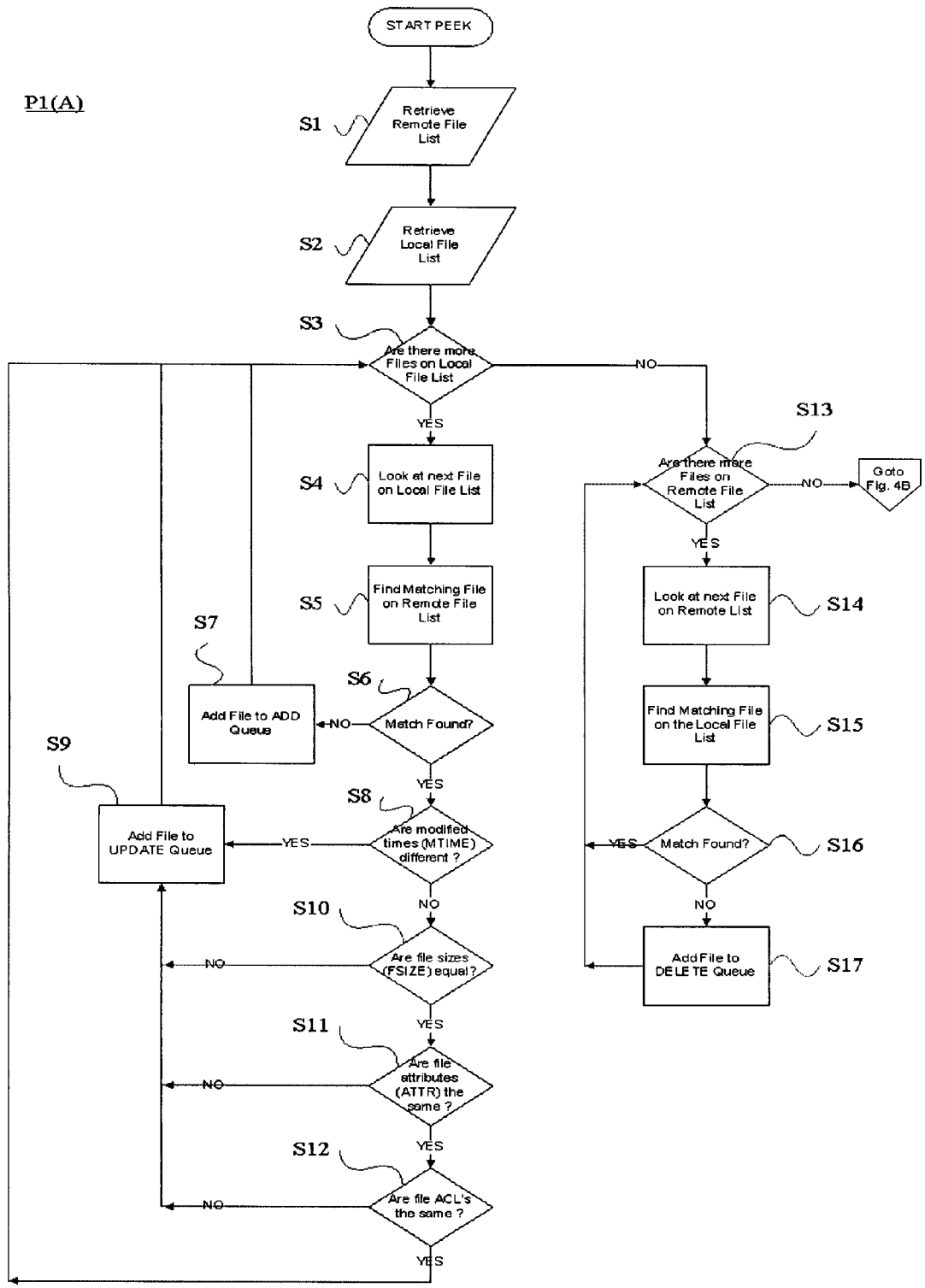
FIGS. 4A-B are a flow chart depicting the operation of a first process for work determination of an embodiment of the inventive computer file backup system.
Figure 4B:
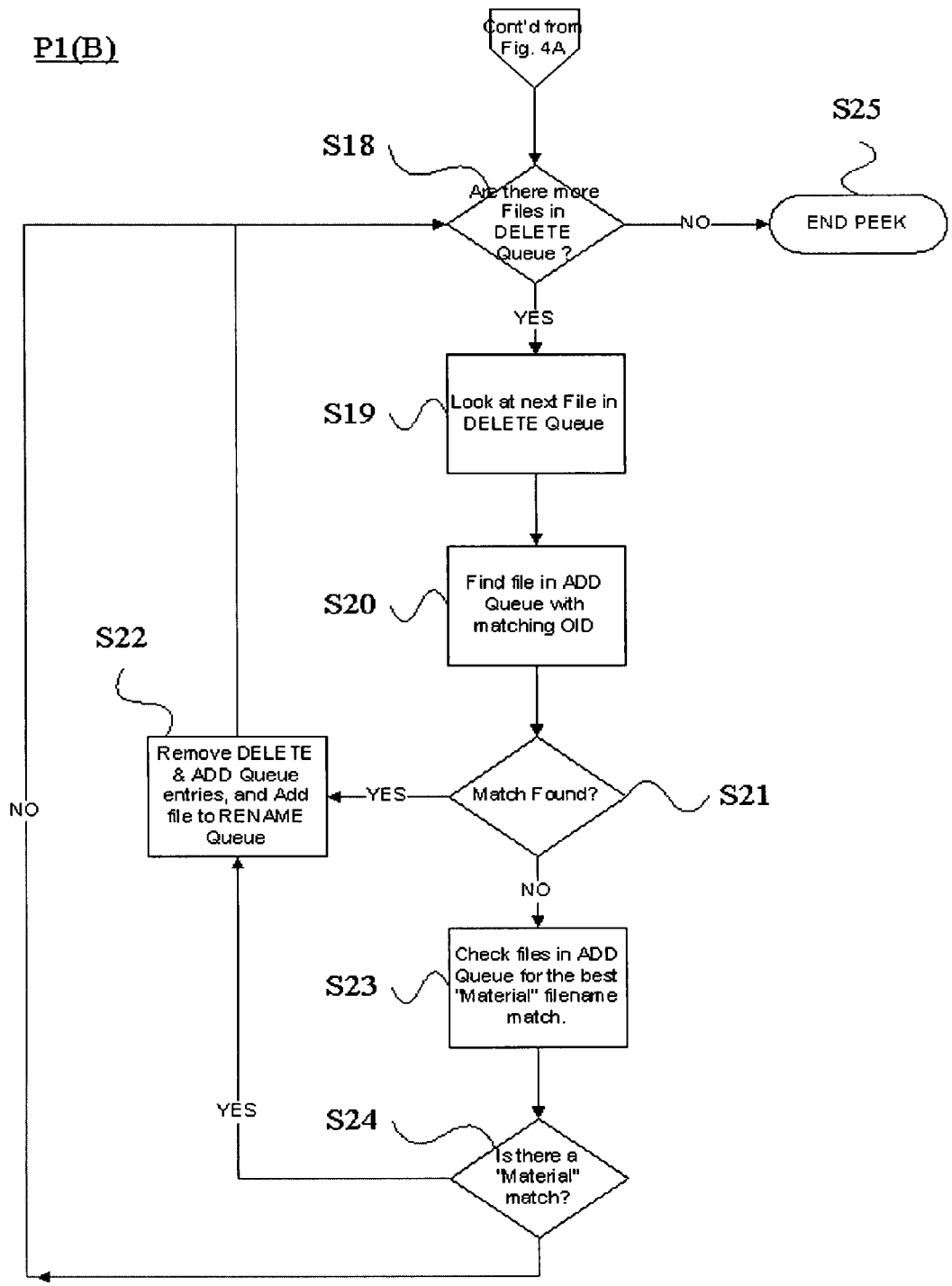

The PEEK process is depicted in detail in FIGS. 4A-B. The process is started when the remote file list is retrieved in step S1 and the local file list is retrieved in step S2. At step S3 of the PEEK process, the local list is examined. If there are more files to be looked at on the local list, the process continues to step S4; if there are not more files on the local list, the process continues to step S13.

A file is selected on the local file list at step S4, and a matching file is sought on the remote file list at step S5. If no match is found at comparison step S6, then the new file on the local list is added to the ADD queue at step S7, and the process returns to determine if there are any more files on the local list at step S3. If a matching file is found at step S6, several queries are run to determine if the local file has been updated since the time the matching remote file was copied: the modified times (MTIME) are checked at step S8, the file sizes (FSIZE) are checked at step S10, the file attributes (ATTR) are rechecked at step S11, and the file access control lists (ACL) are checked at step S12. If any of the queries in steps S8 and S10-12 detect a difference in the local and corresponding remote files, that file is added to the UPDATE queue at step S9, and the process returns to step S3. If no differences are detected, the process returns directly to step S3, leaving the remote file unaffected (as it has been determined not to have been modified since the last time the corresponding local file was modified).

Eventually, there will be no more files to examine on the local list at step S3, and the process will pass to step S13 to examine the files on the remote list. A file is selected on the remote list at step S14, and the matching file on the local list is sought at step S15. If a match is found on the local list as determined at step S16, then the next remote file is selected (no differences check must be run, as it has already been run in step S8 and S10-12). If no match is found on the local list for the examined file on the remote list, the remote file is added to the DELETE queue at step S17, and the next file is selected at step S13.

When there are no more files to examine on the remote list, the process continues (on FIG. 4B) to examine the files in the DELETE queue at step S18. The next file on the DELETE queue is selected at step S19, and a file on the ADD queue with a matching OID is sought in step S20. If a matching file having the same OID is found at step S21, then the corresponding files are taken off the DELETE and ADD queues and the file is added to the RENAME queue at step S22. If a match is not initially found at step S21, then a materiality comparison is made of the files on the ADD queue for the best match at step S23. If a material match is found in comparison step S24, then the DELETE and ADD queue entries are removed and the most material file is added to the RENAME queue at step S22. If not, the process moves on to the next file at step S18. When there are no more files to examine in the DELETE queue, PEEK process P1 ends at step S25.

Pruning process P2 is colloquially known as the PRUNE process and is responsible for making changes to the server's files and folders. The range of available changes are i) deleting files/folders on the server, and ii) renaming files/folders on the server. This step uses the work queues created by the PEEK step, so must run after it.

After processing each file on the RENAME queue, each file is then moved to the UPDATE queue. This will catch situations where rename was not the correct operation (meaning the "Material" check resulted in a false positive).

Figure 5:
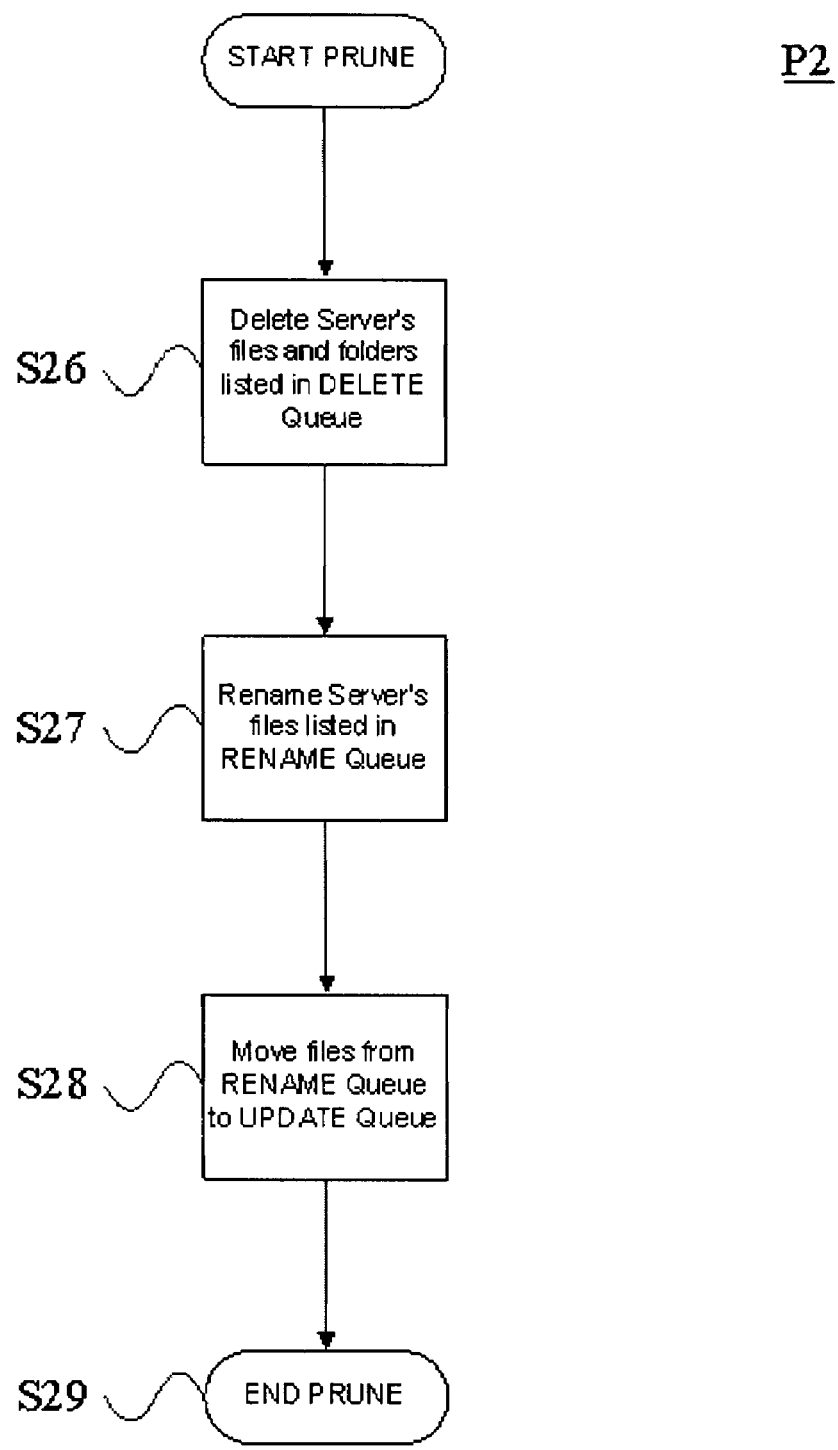
FIG. 5 is a flow chart depicting the operation of a second process for pruning of an embodiment of the inventive computer file backup system.

FIG. 5 describes the steps of the PRUNE process P2. In step S26, the files listed in the DELETE queue are deleted, and in step S27, the files listed on the RENAME queue are renamed. In step S28, the files on the RENAME queue are moved to the UPDATE queue to insure that every file on the RENAME queue was appropriately placed there. Process P2, the PRUNE step, ends at step S29.

The next process is the update request process P3, colloquially known as PICK. The PICK process P3 is used by a client whenever it decides to update a file on the server. PICK process P3 involves the client requesting the server to calculate a pair of block hashes (e.g., fast and strong) on a file the client intends to update that already exists on the server. Hash is a term that describes a broad class of reproducible methods of turning some kind of data into a relatively small number that may serve as a digital "fingerprint" of the data. The algorithm substitutes or transposes the data to create such fingerprints, called hash values.

During the PICK process, the server breaks a file into non-overlapping blocks, where each block is defined as a plurality of data bytes. All blocks are evenly sized, except for the last block which can be smaller than the others. The size of each block is the square root of the file size. If the square of the file is less than 704 bytes, the block size is set to 704 bytes. For each block, the server computes two hash values. The first hash is a 32-bit value defined by the following equation:

$$r_1(k, L) = \left(\sum_{i=0}^{L-1} a_{i+k}\right) \bmod M \quad (1)$$

$$r_2(k, L) = \left(\sum_{i=0}^{L-1} (L-i)a_{i+k}\right) \bmod M$$

$$r(k, L) = r_1(k, L) + Mr_2(k, L)$$

Where:
L=size of the block in bytes
k=the byte offset in the file
a=the plurality of file bytes
M=2^16

This equation was developed by Andrew Tridgell as part of his thesis "*Efficient Algorithms for Sorting and Synchronization*," written in 1999.

The second hash value is a 128-bit MD4 Message Digest. MD4 was developed by Professor Ronald Rivest of MIT in 1990. The algorithm was released into the public domain in 1992. The algorithm is defined in RFC 1320.

By breaking the files into blocks and using hash values, only the changes to the file that were made since the last back-up need to be transmitted from client to server. By doing so, the amount of data being transmitted is greatly reduced, thereby reducing backup time significantly.

Figure 6:
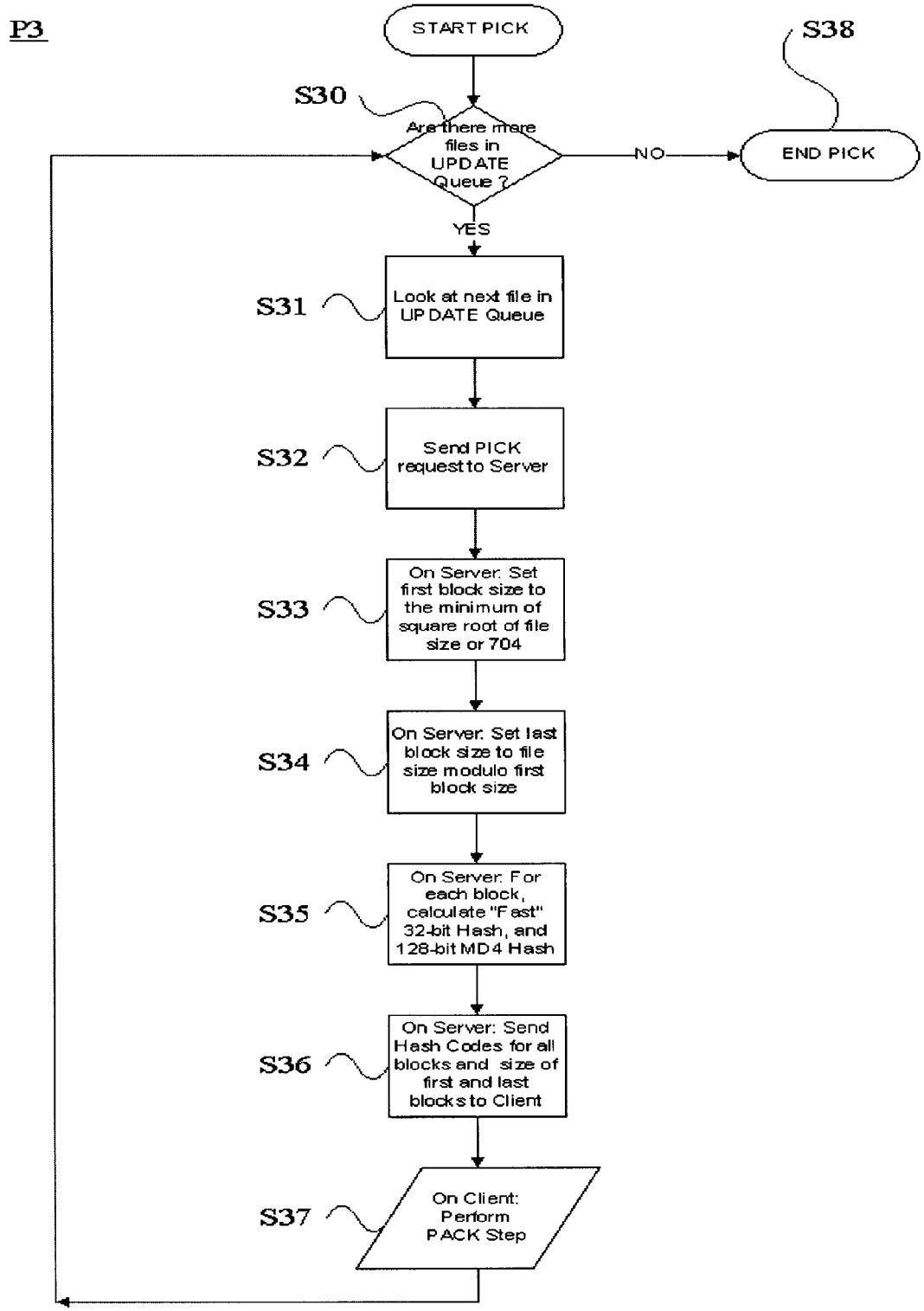
FIG. 6 is a flow chart depicting the operation of a third process for update requesting of an embodiment of the inventive computer file backup system.

The specific steps of the PICK process P3 are listed in FIG. 6. The process queries if there are any files in the UPDATE queue at step S30, and if so, the next file is examined at step S31. A PICK request is sent to the server at step S32. On the server, the first block size is set to the minimum of the square root of the file size or 704, whichever is greater. The last block is set to the remainder of whatever is left after the other blocks are partitioned, in step S34. In step S35, a fast 32-bit hash and a 128-bit MD4 hash are calculated. The hash codes for all the blocks and the respective sizes of the first and last blocks are sent to the client at step S36. In response, the client commences the update instruction process P4 at step S37. When there are no more files on the UPDATE queue, PICK process P3 ends at step S38.

The update instruction process P4 ("PACK") is responsible for transmitting instructions a server can use to update its files. The instructions are created by a client and sent to a server over the network. The instructions describe the precise steps a server needs to take to re-create a copy of the client's file.

There are three types of instructions passed from client to server. They are:

Block Copy—identifies a block or range of blocks within a file a server should reuse when creating the new file.

Data Copy—Provides a literal byte or plurality of bytes to use when creating the new file.

File Hash—Provides the file based hash the server can use to verify the re-created file matches the file hash of the client's copy of the file.

Figure 7A:
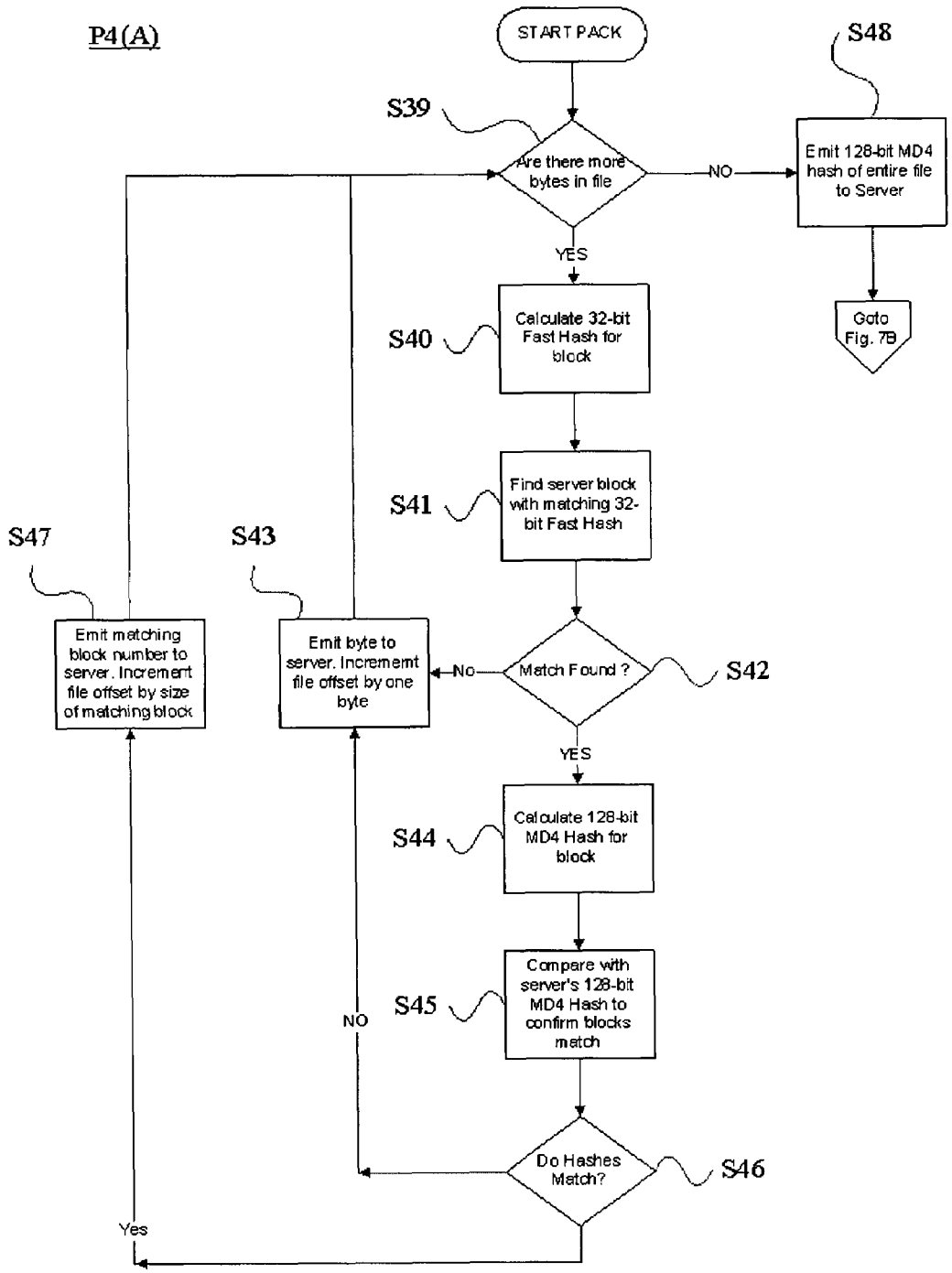
FIGS. 7A-B are a flowchart depicting the operation of a fourth process for update instruction generation and transmission of an embodiment of the inventive computer file backup system.
Figure 7B:
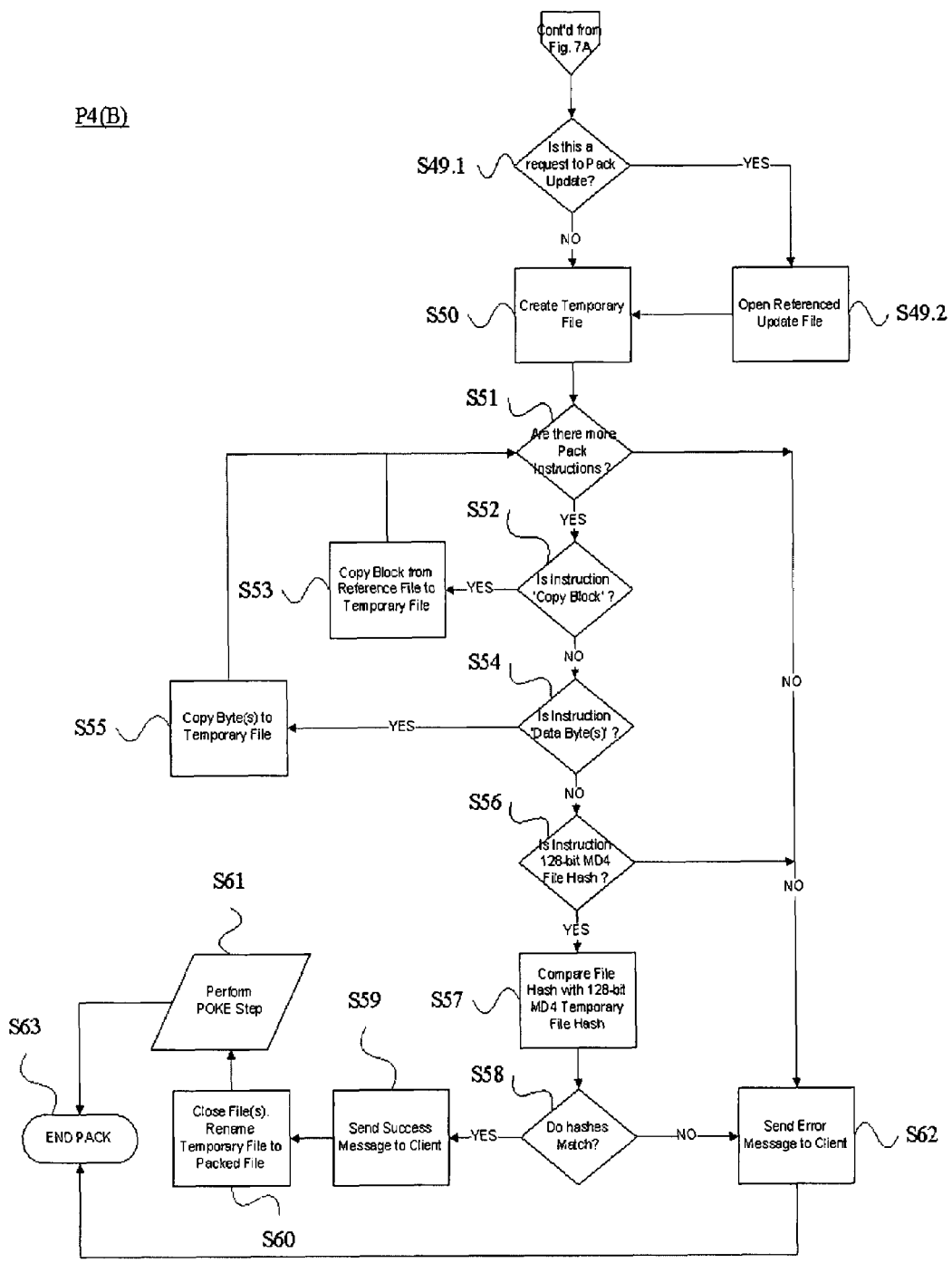
Figure 8:
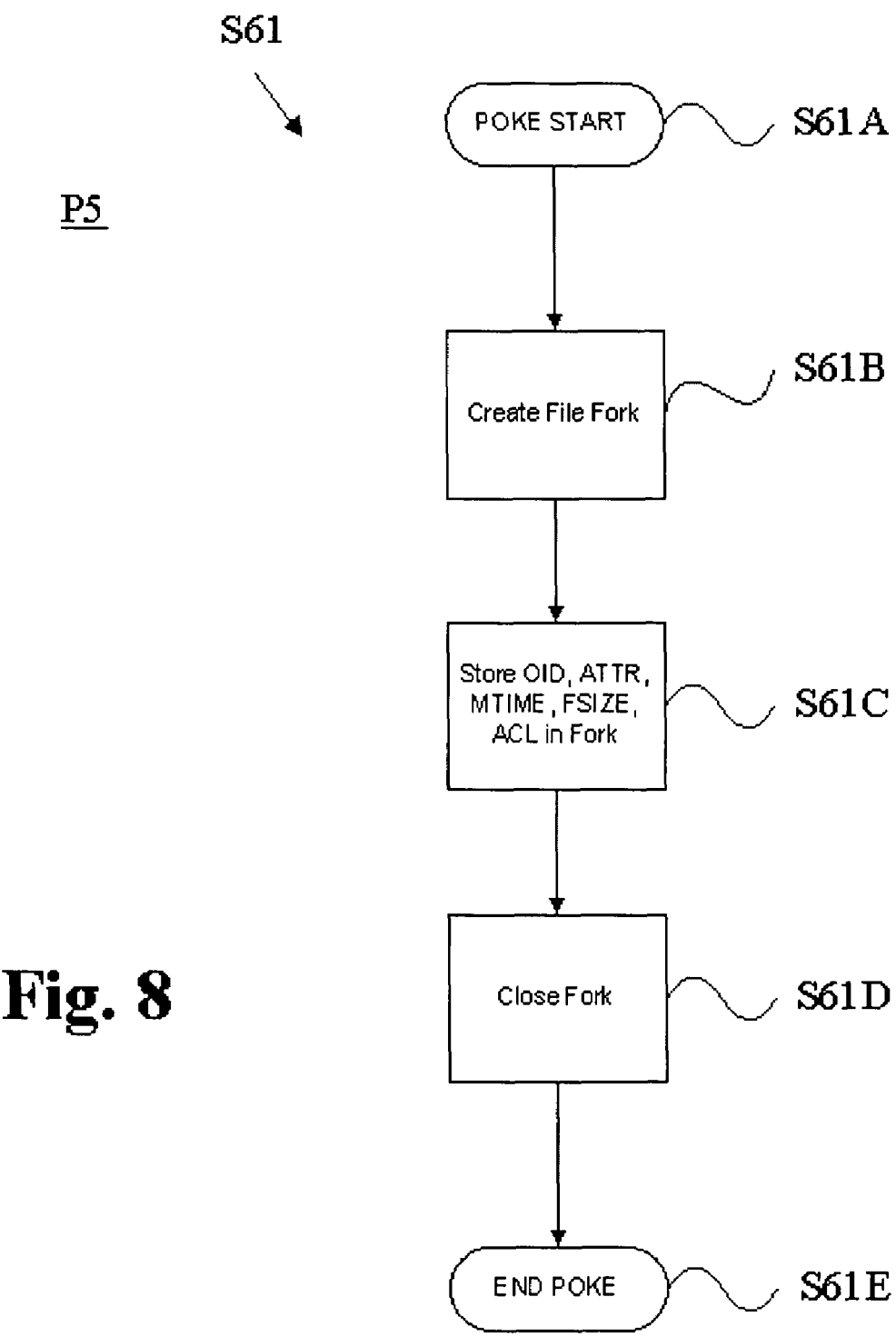
FIG. 8 is a flowchart depicting the operation of a fifth process for metadata updating and storing of an embodiment of the inventive computer file backup system.

The PACK process P4 is depicted in detail in FIGS. 7A-B. In step S39, a query is run to see if there are any bytes left that have not been examined in a given file. If so, a 32-bit fast hash is calculated for the block at step S40, and a block on the server having a matching 32-bit fast hash is sought in step S41. If not, the byte is sent to the server at step S43, the file offset is incremented by one byte, and the process moves onto the next byte. If a match is found in step S42, then a 128-bit MD4 hash is calculated at the client for the block at step S44 which is compared to the server's corresponding 128-bit MD4 hash at step S45 to confirm the blocks match. If the hashes match at step S46, then the matching block number is sent to the server at step S47, and the file offset is incremented by the size of the matching block. If the hashes do not match, then the data byte(s) itself is sent to the server in step S43 as above. When there are no more bytes to be examined in the file at step S39, the client sends a 128-bit MD4 hash of the entire file to the server at step S48.

Continuing in FIG. 7B, the server determines if the instruction in question is an update (of an existing file) or an add (a new file) instruction at step S49.1. If it is an update instruction, the server opens a reference file at step S49.2 and creates a temporary file at step S50; if not, the server only creates a temporary file at step S50. It is determined if there are more PACK instructions at step S51, and if so, several queries are run concerning the next instruction. If the instruction is determined to be "copy block" at step S52, then the block is copied from the reference file to the temporary file at step S53. If the instruction is determined to be "data byte(s)" at step S54, then the relevant byte or bytes are copied to the temporary file at step S55. If the instruction is determined to be the 128-bit MD4 file hash at step S56, then it is compared with the corresponding hash of the temporary file at step S57. If the hashes match at step S58, then a success message is sent to the client at step S59, the files are closed and the reference file is replaced with a temporary file at step S60, and the server initiates process P5 at step S61. If, in any of steps S51, S56, and S58, the result is negative, an error message is sent to the client at step S62. The PACK process P4 ends at step S63.

The final process P5 ("POKE") updates the metadata of the files. The POKE process is responsible for updating files and folder attributes on the Server. During POKE, a client transmits Object Identifier (OID), Access Controls (ACLs), Attributes (ATTR), File Sizes (FSIZE) and Modified Times (MTIME) from client to server. The server then stores this information in a file system fork in the file on the server. In computer file systems, a fork is additional data associated with a file system object. A file system might support only one fork per file or might support multiple-named forks. By storing file metadata in a fork, it enables the inventive system to communicate this information from a customer's computer, back to the central datacenter (via the onsite backup device), even onto tape, and still preserve the metadata of the files. Since the Object Identifier (OID) is stored everywhere a file is transmitted to, it is possible to track it every place it exists. The preservation of OID in this fashion makes it possible to accurately track file moves and renames. This makes it possible to reliably follow or track/replay renames and moves from client to server and resolve the backlog caused by a location's reorganizing of its files without actually modifying them.

By storing Access Controls (ACLs) in the file system fork, it is also possible to reliably store and communicate organization-unique security information. Thus, when customers or locations need to recover their files from a disaster, they are able to recover access controls, saving days of manual input and labor.

The POKE process P5 begins at step S61A, and a file fork is created at step S61B. The metadata for that file (e.g., OID, ATTR, FSIZE, MTIME, ACL) is stored in the fork at step S61C, and the fork is closed at step S61D. The process terminates at step S61E.

The invention is not limited to the above description. For example, in the examples described above and depicted in the drawings, each location is provided with a single onsite backup device. However, for large or complex locations, multiple onsite back-up devices may be provided. Similarly, the centralized site need not be limited to a single backup device; multiple central backup devices may be provided as well. Also, the metadata of a file is listed as including OID, FSIZE, ATTR, MTIME, and ACL. It should be understood that any other relevant metadata, either in use now or in the future, may be stored in the file fork employed by the inventive system.

As previously discussed, a location's computer is first backed-up by an onsite device using the 5-step PEEK, PRUNE, PICK, PACK, and POKE processes and software. Then, the onsite back-up device is itself backed-up to an offsite or centralized datacenter, again by using the same software and processes: PEEK, PRUNE, PICK, PACK, and POKE. In this manner, a location's files are remotely safeguarded, reliably and accurately, with minimum time and opportunity for error.

Having described the invention with reference to particular embodiments, it should be understood that the invention is not limited to the above description or even to the embodiments shown in the attached exemplary drawings but rather by the claims appearing hereinbelow as well as equivalents thereof. Modifications apparent to one skilled in the art are considered to be within the scope of the invention.

What is claimed is:

1. An offsite computer file backup system backing up original customer computer files residing on a primary device, comprising:
   a first instance of file modification detection software residing on the primary device;
   an onsite backup device, in communication with the primary device, on which a first copy of the customer computer files are backed up, said onsite backup device including: i) a first instance of file modification detection software in communication with said first instance of said file modification detection software, and ii) a second instance of said file modification detection software;
   an offsite central backup device, in communication with the onsite backup device, on which a second copy of the customer computer files are backed up, said offsite central backup device including a second instance of said file modification software in communication with said second instance of said file modification detection software,
   wherein said file modification detection software detects respective changes to the files between i) the original files and said first copy, and/or ii) said first copy and said second copy, to enable said onsite and offsite central backup devices to determine which files have been updated or renamed, and
   wherein said first and second instances of said file modification software respectively alter said first and second copies of the customer computer files in accordance with instructions respectively from said first and second instances of said file modification detection software, and
   wherein said file modification detection software comprises a metadata update module for updating file metadata information and storing said metadata information in at least one file system fork associated with each file on a corresponding, respective remote device.

2. A computer file backup system in accordance with claim 1, wherein said file modification detection software detects differences in at least one of: modified time, file size, access control list, file attributes, or object identifier.

3. A computer file backup system in accordance with claim 1, wherein said file modification detection software stores detected changes on an update list.

4. A computer file backup system in accordance with claim 3, wherein said file modification detection software transmits only the changes to files on said update list from the primary device to said onsite backup device and from said onsite backup device to said offsite central backup device.

5. A computer file backup system in accordance with claim 4, wherein said transmitted changes are block level changes.

6. A computer file backup system in accordance with claim 1, said file modification detection software comprising a work determination module for generating and comparing respective lists of files on logically adjacent of said primary, onsite backup, and offsite central backup devices.

7. A computer file backup system in accordance with claim 1, said file modification detection software comprising a pruning module for deleting any remote files on a remote device that do not exist on a corresponding respective local device, and for renaming files on a remote device that were renamed on a corresponding respective local device.

8. A computer file backup system in accordance with claim 1, said file modification detection software comprising an update request module for requesting block hashes for those remote files that need updating on a remote device.

9. A computer file backup system in accordance with claim 1, said file modification detection software comprising an update instruction generation module for generating file update instructions by a local device and transmitting said file update instructions to a corresponding, respective remote device.

10. An offsite method of backing up original customer computer files residing on a local device, comprising the steps of:
   generating and comparing lists of files on logically adjacent local and remote devices to determine what changes have occurred to the files;
   requesting consolidated file identifiers for remote files that need updating on a remote device;

generating file update instructions by a local device to be transmitted to a logically adjacent corresponding remote device; and updating file metadata information and storing said metadata information in a file system fork associated with each file on said remote device.

11. A method of backing up original customer computer files in accordance with claim 10, wherein said updating step updates and stores OID and at least one of FSIZE, MTIME, ATTR, or ACL metadata.

12. A method of backing up original customer computer files in accordance with claim 10, wherein said consolidated file identifiers comprise block hashes.

13. A method of backing up original customer computer files in accordance with claim 10, further comprising the steps of:

deleting any remote files that do not exist on a corresponding local device; and renaming any files on a remote device that were renamed on a logically adjacent corresponding local device.

14. A method of backing up original customer computer files in accordance with claim 10, wherein said generating and comparing step creates the following file queues: ADD, DELETE, UPDATE, and RENAME.

15. A method of backing up original customer computer files in accordance with claim 14, further comprising the steps of:

deleting any remote files appearing on the DELETE queue; and renaming any files appearing on the RENAME queue.

16. A method of backing up original customer computer files in accordance with claim 14, further comprising the step of:

attempting to match the OID of a file on the DELETE queue to an OID of a file on the ADD queue, wherein if an OID match is made, removing the corresponding files on the ADD and DELETE queues and placing the file on the RENAME queue.

17. A method of backing up original customer computer files in accordance with claim 14, further comprising the steps of:

attempting to match the file name of a file on the DELETE queue to the most material matching file name of a file on the ADD queue; and removing the corresponding files on the ADD and DELETE queues and placing the file on the RENAME queue.

18. A method of backing up original customer computer files in accordance with claim 17, wherein said attempting to match step further comprises the steps of:

counting consecutive matching pieces of file names from right to left; and selecting the corresponding file with the highest number of consecutive matching pieces.

19. An offsite computer file backup system backing up original customer computer files residing on a primary device, comprising:

an onsite backup device, in communication with the primary device, on which a first copy of the customer computer files are backed up, said onsite backup device including: i) a first instance of file modification detection software in communication with the primary device, ii) a first instance of file modification software in communication with said first instance of said file modification detection software, and ii) a second instance of said file modification detection software; and an offsite central backup device, in communication with the onsite backup device, on which a second copy of the customer computer files are backed up, said offsite central backup device including a second instance of said file modification software in communication with said second instance of said file modification detection software, wherein said file modification detection software detects respective changes to the files between i) the original files and said first copy, and/or ii) said first copy and said second copy, to enable said onsite and offsite central backup devices to determine which files have been updated or renamed, and wherein said first and second instances of said file modification software respectively alter said first and second copies of the customer computer files in accordance with instructions respectively from said first and second instances of said file modification detection software, and said file modification detection software comprises a metadata update module for updating file metadata information and storing said metadata information in at least one file system fork associated with each file on a corresponding, respective remote device.

20. An offsite computer backup system according to claim 19, wherein said metadata update module updates and stores OID and at least one of FSIZE, MTIME, ATTR, or ACL metadata for each file.

* * * * *